US012803029B2

United States Patent
(12)

Nehter et al.

(10) Patent No.: US 12,803,029 B2

(45) Date of Patent: Nov. 17, 2026

(54) SOLID OXIDE FUEL CELL STACK FOR AN AIRCRAFT ENGINE

(71) Applicant: Airbus Operations GmbH, Hamburg (DE)

(72) Inventors: Pedro Nehter, Heikendorf (DE); Helge Geisler, Hamburg (DE); Vignesh Ahilan, Schenefeld (DE)

(73) Assignee: Airbus Operations GmbH, Hamburg (DE)

( * ) Notice: Subject to any disclaimer, the term of this patent is extended or adjusted under 35 U.S.C. 154(b) by 612 days.

(21) Appl. No.: 18/385,475

(22) Filed: Oct. 31, 2023

(65) Prior Publication Data

US 2024/0154144 A1 May 9, 2024

(30) Foreign Application Priority Data

Nov. 4, 2022 (EP) .................................... 22205629

(51) Int. Cl.

| | |
|---|---|
| ***H01M 8/243*** | (2016.01) |
| ***B64D 27/355*** | (2024.01) |
| ***F02C 7/22*** | (2006.01) |
| ***H01M 8/12*** | (2016.01) |
| ***H01M 8/1231*** | (2016.01) |
| ***H01M 8/2457*** | (2016.01) |

(Continued)

(52) U.S. Cl.

CPC .......... *H01M 8/243* (2013.01); *B64D 27/355* (2024.01); *F02C 7/22* (2013.01); *H01M 8/1231* (2016.02); *H01M 8/2457* (2016.02); *H01M 8/2475* (2013.01); *H01M 8/2484* (2016.02); *H01M 8/2495* (2013.01); *H01M 2008/1293* (2013.01); *H01M 2250/20* (2013.01)

(58) Field of Classification Search

CPC ..................................................... H01M 8/243

See application file for complete search history.

(56) References Cited

U.S. PATENT DOCUMENTS

| | | | | |
|---|---|---|---|---|
| 2014/0047814 A1 | 2/2014 | Steinwandel | | |
| 2014/0202167 A1* | 7/2014 | Mori | F02C 3/20 | 60/793 |
| 2022/0411083 A1* | 12/2022 | Kierbel | H01M 8/004 | |

FOREIGN PATENT DOCUMENTS

| | | |
|---|---|---|
| FR | 3104139 A1 | 6/2021 |
| JP | 2014137977 A | 7/2014 |

OTHER PUBLICATIONS

European Search Report for Application No. 22205629 dated May 3, 2023.

* cited by examiner

*Primary Examiner* — Brian R Ohara

(74) *Attorney, Agent, or Firm* — KDW Firm PLLC

(57) ABSTRACT

A solid oxide fuel cell stack for an aircraft engine includes ring-shaped fuel cell assemblies of parallel tubular oxide fuel cells circumferentially around a central axis. A first stacking manifold for each fuel cell assembly is in contact with a first side of the individual fuel cell assembly, a second stacking manifold is in contact with a second side of the individual fuel cell assembly, and a central recess for leading an engine shaft through. Each fuel cell includes a tubular anode and tubular cathode, the fuel cell assemblies stacked in an axial direction through pairs of first and second stacking manifolds contacting each other. Each first stacking manifold includes a hydrogen inlet and is connected to first ends of the anodes of the fuel cells. Each second stacking manifold includes a hydrogen and steam outlet and is connected to second ends of the anodes of the fuel cells.

15 Claims, 5 Drawing Sheets

(51) Int. Cl.

| | |
|---|---|
| ***H01M 8/2475*** | (2016.01) |
| ***H01M 8/2484*** | (2016.01) |
| ***H01M 8/2495*** | (2016.01) |

SOLID OXIDE FUEL CELL STACK FOR AN AIRCRAFT ENGINE

TECHNICAL FIELD

The disclosure herein relates to a solid oxide fuel cell stack for an aircraft engine as well as an aircraft engine having a solid oxide fuel cell stack.

BACKGROUND

Propulsion for transport or passenger aircraft is typically provided by jet or combustion engines using hydrocarbon-based fuel, which lead to a certain carbon footprint, NOx emissions as well as noise. As an alternative, hydrogen produced by renewable energy for future aircraft is a zero-carbon fuel burned with oxygen from the atmosphere. However, the direct usage of hydrogen in a jet engine also results in the generation of NOx. Additionally, this process results in low efficiency of the engine.

Solid oxide fuel cells (SOFC) are energy conversion devices, which use hydrogen as fuel and converts its chemical energy into electrical and thermal energy. The power is generated by an electrochemical reaction, which is a safe non-combustion reaction. SOFCs are widely used for stationary application and are able to produce power with high fuel utilization of up to 85%. An SOFC consists of an anode, a cathode, electrolyte, and current collecting components/interconnectors. The oxygen reduction reaction occurs in the porous cathode by accepting electrons and producing oxide ions, which travel through the gas tight electrolyte to the anode interface. The hydrogen fuel gets oxidized at the anode interface by accepting oxide ions and producing electrons, which pass to the cathode side through an external electrical circuit. The operating temperature of SOFC is usually in a range of 600° C. to 900° C., which depends on the choice of SOFC materials.

Concepts exist, in which SOFCs are integrated into drive units for propulsion of aircraft. For example, EP 2 700 120 A1 discloses a drive unit, comprising a combustion chamber for combusting a fuel/air mixture, and a solid oxide fuel cell device, wherein the fuel cell device comprises at least one fuel cell which in each case comprises an anode that is couplable to a fuel line, a cathode that is couplable to an air source, and a fluid outlet, and is arranged upstream of the combustion chamber. The combustion chamber comprises a combustion chamber inlet for supplying the fuel/air mixture, and a combustion chamber outlet for discharging exhaust gas, and the combustion chamber inlet is connected to the fluid outlet of the fuel cell device.

SOFC for stationary application are often chosen in the form of planar type SOFC, which have a low gravimetric power density and may experience high thermal stress to the cell at fast heating and cooling rates. The low gravimetric power density of the stack is mainly due to a heavy bipolar plate used in the design. Alternatively, tubular design SOFCs offer a huge advantage on high gravimetric power density, high surface to volume ratio and low thermal stresses. Moreover, an integration of tubular SOFC to a stack is flexible depending on the application. Above-mentioned drive unit uses a ring of tubular SOFC.

Stacks with a large number of tubular SOFCs staggered in two dimensions may experience a disadvantageously wide temperature profile inside the stack and difficulties in extracting the heat from the stack. This may result in the degradation of cell materials and result in degraded performance, and the integration of a cooling system to harmonize the wide temperature profile would be technically challenging.

SUMMARY

It is thus an object of the disclosure herein to propose an alternative solid oxide fuel cell stack for an aircraft engine having tubular SOFCs staggered in one or two dimensions, which allows to deliver power at a high efficiency and with a clearly reduced risk of degradation.

This object is met by the solid oxide fuel cell stack for an aircraft engine as disclosed herein. Advantageous embodiments and further improvements may be gathered from the following description.

A solid oxide fuel cell stack for an aircraft engine is disclosed, comprising a plurality of ring-shaped fuel cell assemblies of a plurality of tubular solid oxide fuel cells each, the fuel cells being arranged parallel to each other and distributed circumferentially around a central axis, at least one first stacking manifold for each fuel cell assembly in contact with a first side of the individual fuel cell assembly, at least one second stacking manifold for each fuel cell assembly in contact with a second side of the individual fuel cell assembly, and a central recess for leading an engine shaft through, wherein the fuel cells each comprise a anode and a cathode, wherein the fuel cell assemblies are stacked in an axial direction through pairs of first and second stacking manifolds contacting each other, wherein each first stacking manifold comprises a hydrogen inlet and is connected to first ends of the anodes of the respective fuel cells, and wherein each second stacking manifold comprises a hydrogen and steam outlet and is connected to second ends of the anodes of the respective fuel cells.

In the following, the term "solid oxide fuel cell" is referred to as "SOFC" for an improved readability. Also, in the context of this disclosure herein, the term "fuel cell" refers to a solid oxide fuel cell if another type of fuel cell is not explicitly mentioned.

The fuel cell stack according to the disclosure herein thus comprises several ring-shaped fuel cell assemblies that are delimited by a first and a second stacking manifold each, wherein the individual assemblies are aligned in an axial arrangement and are electrically connected to each other to form the fuel cell stack. By providing the central recess, an engine shaft can reach through the fuel cell stack. The overall design of the fuel cell stack is hollow-cylindrical and each of the assemblies comprises a ring shape. The ring shape may include at least one ring of tubular SOFCs arranged in a circumferential direction on the same diameter. If desired, several concentric rings may be formed in each assembly, in which the SOFCs are also packed in the radial direction.

The first stacking manifold and the second stacking manifold axially enclose the respective assembly and provide for their electrical interconnection. The stacking manifolds may comprise a single part that electrically connects at least a part of the SOFCs in a parallel connection. However, also segmented stacking manifolds are conceivable that provide a plurality of individual groups of electrically parallel connected SOFCs, which may then be connected to each other in a serial connection, upon desire. The first stacking manifolds are used for delivering hydrogen into the SOFCs. The second stacking manifolds are used for receiving residual hydrogen that flows out of the SOFCs. Thus, the stacking manifolds may provide the function of electrical connection, i.e. a current collection, and the connection to a hydrogen source and hydrogen sink at the same time. Combining these functions into a single component allows to minimize the material usage. The stacking manifolds may be designed as hollow ring-shaped devices that are capable of being flown-through in order to distribute and/or collect fluids. They can be understood as flat chambers with a shape adapted to conform the respective SOFCs. At a side facing the SOFCs, the stacking manifolds may have a flat, plate-like shape, which allows to electrically connect the respective stacking manifold to the respective SOFCs.

The individual tubular SOFCs are open on two sides and may comprise one of a variety of different material combinations. When choosing or designing the SOFCs, the internal diameter and the external diameter, the spacing distance, and the surface available for the fuel cell process can be influenced. The tubular shape of the SOFCs ensures that a high mass flow of particularly hydrogen is achieved.

The electrolyte of these SOFCs preferably comprises a ceramic material that is conductive to oxygen ions while having an insulating effect on electrons. Doped zirconium dioxide, for example doped with yttrium, in particular 8 mol % yttrium doped zirconium may be a suitable material. The cathode of the SOFC may also be made from a ceramic material, which is conductive both to oxide or oxygen ions and to electrons, for example based on doped lanthanum manganate, with such doping taking place with the use of strontium or the like. Mixed ionic and electronic conductive material may be used, e.g. (La0.60Sr0.40) 0.95Co0.20Fe0.80O3-X. An anode of this fuel cell may be made from a cermet material, which comprises ceramic and metallic material. For example, a compound comprising a mixed conducting material, e.g. Ni-8YSZ nickel-doped and yttrium-doped zirconium oxide, in order to conduct ions and electrons. With the use of tubular SOFCs a multitude of self-contained fuel cells can be arranged in a ring-shaped manner around a shaft between a turbine and a compressor so that particularly high electrical power can be provided with integration that is as compact as possible, and at the same time the through-flow of hydrogen and air is improved.

The design of the tubular SOFCs may comprise circular, elliptical, rectangular, polygonal, or other regularly shaped or irregularly shaped cross sections, to which shapes the subject of the disclosure herein is not limited. This also relates to the course of a cross section along the length of a tubular SOFC, which course is either constant, resulting for example in a cylindrical shape of the ceramic tube, or is not constant, resulting in a conical shape. Furthermore, the tubular SOFCs may also be designed with integrated form-fitting elements to simplify holding the tubular SOFCs in receiving openings.

The SOFCs may comprise an anode formed by an inner surface, and a cathode formed by an outer surface. The design of the tubular SOFCs is thus particularly simple and robust, and conducting the electrical power provided can be implemented by a mechanical mount of the SOFCs in the stacking manifolds.

As an alternative to this, each SOFC may comprise a separate first electrode, which is connected to the outside of the SOFC, and a separate second electrode, which is connected to the inside of the SOFC. In this way, conduction of the electrical power to the stacking manifolds and thus, to an external circuit, is conducted.

The voltage and power delivered by the fuel cell stack depends on the number of the SOFCs, their electrical connection, as well as of the number of assemblies arranged in the stack. The number of SOFCs in turn depends on the outer diameters, which also influence the packing density given limited dimensions of the stack inside the engine. Generally, SOFCs with the lowest outer diameter may produce a high-power stack due to its occupancy of the large number of cells in the assemblies.

In an advantageous embodiment, the plurality of tubular solid oxide fuel cells of each ring-shaped assembly are staggered radially to form at least two rings of fuel cells. Thus, the packing density of the stack is increased and the maximum power to be delivered by the stack can be greatly raised. The SOFCs may form a square or a hexagonal packing structure, wherein the hexagonal packing structure leads to a higher packing density.

However, it is conceivable that the SOFCs are spaced apart from each other, both in the radial and the circumferential direction, in order to let air flow into porous cathodes.

In an advantageous embodiment, at least one of the fuel cell assemblies comprises at least two groups of fuel cells separated in the radial direction, wherein the at least two groups comprise different types of solid oxide fuel cells with different operating temperature ranges. Thus, the stack has the capability to operate at a wide range of operating temperatures, such that an uneven temperature distribution in the stack does not influence the integrity of the stack. Consequently, bigger, and wider stack designs can be used.

In an advantageous embodiment, the operating temperature range of a radially outer group is higher than the operating temperature range of a radial further inward group. Thus, by arranging SOFCs with a higher operating temperature in radially outer regions is preferred.

In an advantageous embodiment, at least one of the fuel cell assemblies comprises three groups of fuel cells separated in the radial direction with different operating temperature ranges. The power of the stack can thus be clearly increased due to a clearly increased volume used by the SOFCs thanks to three consecutively increased operating temperature regions in the radial direction.

In an advantageous embodiment, a radially outermost group comprises electrolyte supported solid oxide fuel cells, wherein a radially central group comprises anode supported solid oxide fuel cells, and wherein a radially innermost group comprises metal supported solid oxide fuel cells. Electrolyte supported SOFCs comprise anodes and cathodes being realized as a coating on opposite surfaces of a ceramic electrolyte. These comprise the highest operating temperature range. A typical anode supported SOFC may comprise an anode made from a cermet mixture of nickel and yttria stabilized zirconia (YSZ). An anode functional layer, an electrolyte, and a cathode layer are sequentially formed on an anode supporter. The operating temperature range may be slightly below the range of the electrolyte supported SOFCs. Still further, metal-supported SOFCs conventionally comprise an anode electrode layer, which is formed on a porous metal support, which may exemplarily be obtained by sintering Fe—Cr-based alloy powder, and an electrolyte layer may be formed thereon to create the SOFC. Here, the operating temperature range is lower than the other two mentioned types of SOFC.

In an advantageous embodiment, the radially outermost group comprises an operating temperature range of 750° C. to 850° C., wherein the radially central group comprises an operating temperature range of 650° C. to 750° C., and wherein a radially innermost group comprises an operating temperature range of 550° C. to 650° C. The operating temperature may thus spread from 550° C. to 850° C. over the radial extension of the stack, which allows to safely operate the stack without requiring a complicated cooling system to cool the stack or harmonize the stack temperature distribution. The design allows to tolerate a large deviation of operating temperatures.

In an advantageous embodiment, the first stacking manifold and the second stacking manifold are configured to alternately flow hydrogen from the hydrogen inlet of the first stacking manifold through circumferentially successive fuel cells in an alternating axial flow direction in a zigzag manner. A laminar flow of hydrogen through the fuel cells can be achieved also at high flow rates.

In an advantageous embodiment, the first stacking manifold is configured to flow hydrogen from the hydrogen inlet of the first stacking manifold through circumferentially successive fuel cells in the same axial flow direction towards the second stacking manifold. This simplifies the hydrogen supply to the individual fuel cells. Appropriately choosing flow resistances along the flow path of the hydrogen to the individual fuel cells allows to let the hydrogen flow laminarly.

In an advantageous embodiment, the fuel cells are spaced apart from each other in a radial direction, wherein the fuel cell stack comprises a housing enclosing the fuel cells, and wherein an air inlet and an air outlet are arranged at the housing to let air flow through the housing to flush the fuel cells with air. Thus, the fuel cells are enclosed by a housing and are placed in an interior space of the housing. Air enters the housing and flows from the first stacking manifold to the second stacking manifold. In doing so, the fuel cells are flushed by the air, which is then able to enter the cathodes, particularly when they are porous and are at the outermost layer of the fuel cells.

It is conceivable to feed colder air to the metal supported SOFCs through air inlets at radially inward positions, since this type of SOFCs requires colder air than the other types. Air inlets at radially outward positions may supply hotter air primarily to the electrolyte supported SOFCs. Once the air enters into the stack, the air travels through the stack in axial direction to maintain an optimal temperature of the stack. Furthermore, air may also be supplied from the side of the stack.

In an advantageous embodiment, the stack further comprises baffle plates inside the housing, wherein the baffle plates are spaced apart from each other in an axial direction and extend in a radial direction, wherein axially consecutive baffle plates have different radial dimensions, and wherein the baffle plates have openings to let the fuel cells pass through. By using the baffle plates, the air flow between the first stacking manifold and the second will repeatedly be deflected. This leads to a greater vorticity, an improved distribution and a more harmonic oxygen density for all fuel cells arranged inside the housing. Additionally, this will provide mechanical support for the tubular SOFCs. When an axial and lateral air flow is provided, the baffle plates may comprise an additional perforation for letting air penetrate in axial direction. This supports maintaining the stack temperature in optimal condition.

In an advantageous embodiment, the stacking manifolds comprise stainless steel and an aluminum oxide coating. This allows to expose the stainless steel only to the preferred locations of the fuel cells, where the current has to be collected. The coated $Al_2O_3$ layer prevents high temperature corrosion and chromium evaporation from the stainless steel material. The use of stainless steel is beneficial for the durability, mechanical stability, and corrosion resistance. The shape, size, and locations of uncoated parts of the stacking manifolds depend mainly on the electrical connection circuit, which is explained further below.

In an advantageous embodiment, the stacking manifolds comprise a hole for each of the fuel cells. Preferably, an interior surface of the respective hole is at least partially uncoated to provide an electrical contact to the respective fuel cell. The holes also serve for mechanically supporting the fuel cells.

The disclosure herein further relates to an aircraft engine, comprising a solid oxide fuel cell stack according to the above description, a combustion chamber downstream the fuel cell stack, a turbine unit downstream the combustion chamber, and a compressor unit arranged upstream the fuel cell stack and connected to the turbine through an engine shaft extending through the central recess. The engine is able to provide a thrust force and electrical power at the same time by only consuming hydrogen and air, wherein the NOx emission is clearly reduced compared to known hydrogen consuming combustion engines.

In an advantageous embodiment, the combustion chamber is in fluid communication with the hydrogen and steam outlets of the fuel cell assemblies and comprises an air inlet. Thus, residual hydrogen flowing out of the anodes of the fuel cells is combusted inside the combustion chamber. In addition, the combustion chamber may also comprise a separate hydrogen inlet to allow a better mass flow control of hydrogen and to operate the combustion chamber at least partially independent from the operation of the fuel cell stack.

BRIEF DESCRIPTION OF THE DRAWINGS

In the following, the attached drawings are used to illustrate example embodiments in more detail. The illustrations are schematic and not to scale. Identical reference numerals refer to identical or similar elements.

DETAILED DESCRIPTION

Figure 1:
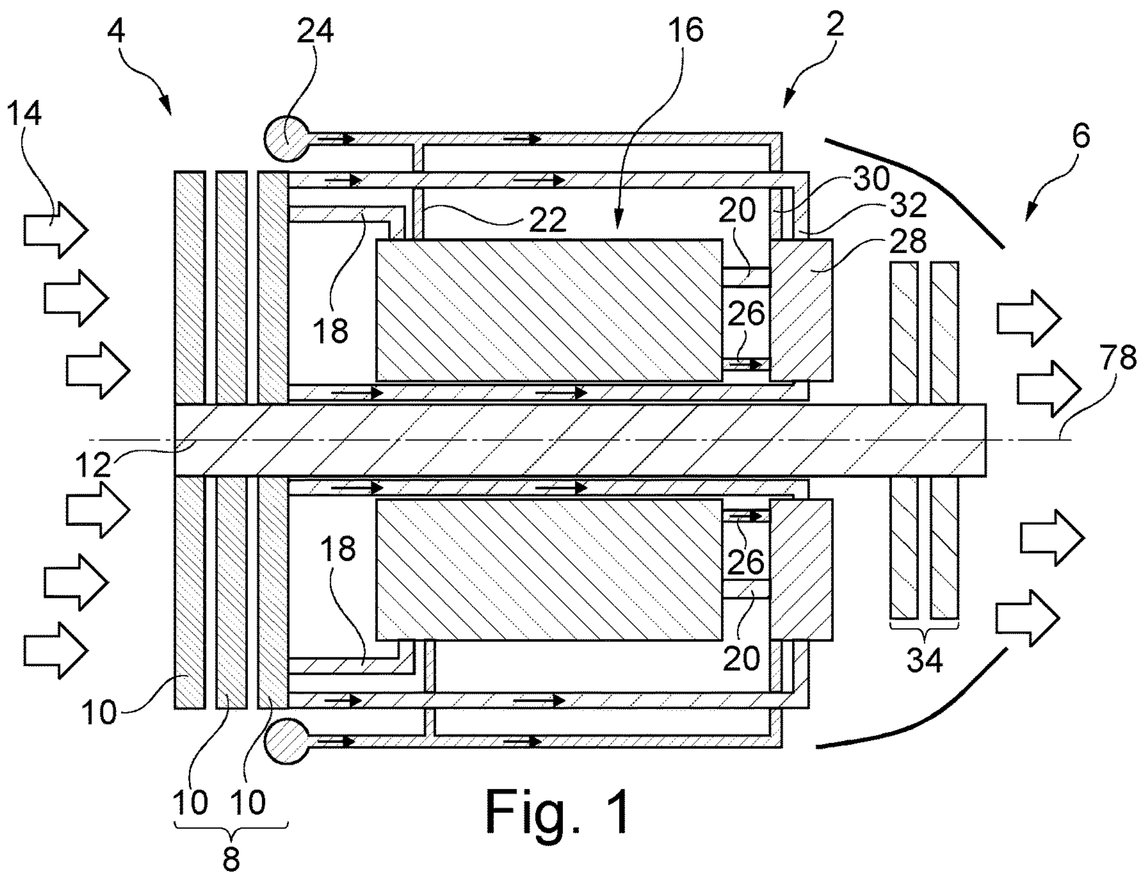
FIG. 1 shows a schematic sectional illustration of an aircraft engine having a fuel cell stack according to an exemplary embodiment.

FIG. 1 shows an aircraft engine 2 in a schematic sectional drawing. A front side 4 is arranged on the left-hand side of FIG. 1, while a rear side 6 is arranged on the right-hand side of FIG. 1. At the front side 4, a compressor unit 8 is present, which comprises exemplarily three compressor wheels 10 arranged one behind each other on an engine shaft 12. They receive air 14 from the surrounding of the engine 2 and compress it. A part of the compressor wheels 10 may be realized in the form of a fan.

Downstream of the compressor unit 8, a solid oxide fuel cell stack 16 is provided, which will be explained in further detail below. It comprises air inlets 18, which are in fluid communication with the compressor unit 8. Air that enters the fuel cell stack 16 flows out through air outlets 20. Furthermore, hydrogen inlets 22 are provided, which are coupled with a hydrogen source 24 for flowing hydrogen into the fuel cell stack 16. Hydrogen and steam outlets 26 are provided to let residual hydrogen as well as steam exit the fuel cell stack 16. The fuel cell stack 16 is provided for conducting a fuel-cell process by consuming hydrogen from the hydrogen source 24 and oxygen from air 14 to produce electricity.

Downstream the fuel cell stack 16, a combustion chamber 28 is provided, which receives air from the fuel cell stack 16 through the air outlet 20 as well as residual hydrogen and steam from the hydrogen and steam outlet 26. In addition, a separate hydrogen inlet 30 and an additional air inlet 32 are provided, through which additional hydrogen from the hydrogen source 24 and air from the compressor unit 8 is fed into the combustion chamber 28. Resultantly, oxygen depleted air and steam exit the combustion chamber 28 and are fed into a turbine unit 34 downstream the combustion chamber 28.

The turbine unit 34 is coupled with the compressor unit 8 through the engine shaft 12. It is impinged by oxygen depleted air and steam and will thus be driven to rotate. The rotation is transferred to the compressor unit 8 through the engine shaft 12 and leads to providing mechanical power for the compressor unit 8. The engine 2 thus produces thrust and electrical power.

Figure 2:
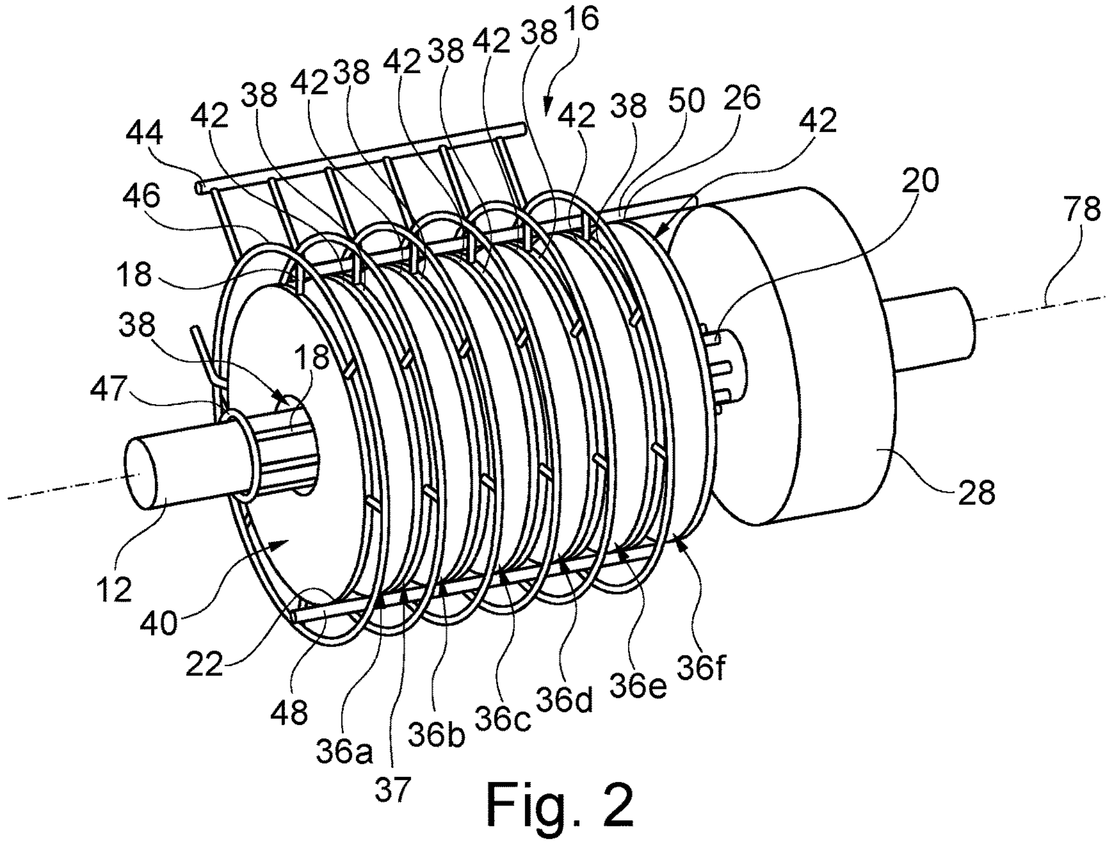
FIG. 2 shows a schematic illustration of the fuel cell stack and a combustion chamber.

FIG. 2 shows the fuel cell stack 16 in a more detailed illustration. Here, a plurality of ring-shaped fuel cell assemblies 36*a*, 36*b*, 36*c*, 36*d*, 36*e*, and 36*f* are shown. They are arranged one after another in an axial direction along the engine shaft 12 and form the fuel cell stack 16. To route the engine shaft 12 through the fuel cell stack 16, a central recess 38 is provided that extends through all ring-shaped fuel cell assemblies 36*a* to 36*f*.

Each of the fuel cell assemblies 36*a* to 36*f* comprise a first stacking manifold 40 and a second stacking manifold 42. The first stacking manifolds 40 each comprise a plurality of air inlets 18, which are distributed in a circumferential direction. In this exemplary embodiment, air inlets 18 are provided at radial outer regions and radial inner regions at the same time. Exemplarily, an air manifold 44 is provided, which delivers air to several circular pipes 46, which each surround one of the first stacking manifolds 40 leading to the radial outer air inlets 18. An inner circular pipe 47, which receives air as well, surrounds the engine shaft 12 and is connected to the radial inner air inlets 18. Each of the second stacking manifolds 42 comprises air outlets 20, e.g. in a radial inner region of the second stacking manifolds 42, which outlets 20 are directly connected to the combustion chamber 28.

Still further, each of the first stacking manifolds 40 comprises the hydrogen inlet 22, which is connected to a hydrogen supply pipe 48. In analogy to this, each of the second stacking manifolds 42 comprises the hydrogen and steam outlet 26 connected to a hydrogen and steam pipe 50. Exemplarily, the fuel cell assemblies 36*a* to 36*f* may constitute an electrical serial connection by directly contacting them through their opposed stacking manifolds. By providing such a serial arrangement, the delivered voltages of each fuel-cell assembly 36*a* to 36*f* are added to a total voltage. Still further, each of the fuel cell assemblies 36*a* to 36*f* comprises a plurality of fuel cells, which are electrically interconnected depending on desired electrical parameters and will be explained in the following. However, it may also be possible to provide gaps 37 between the individual fuel cell assemblies 36*a* to 36*f* and choose a different connection scheme through a suitable wiring.

As apparent from both FIG. 1 and FIG. 2, the combustion chamber 28 may comprise a hollow-cylindrical shape having an outer diameter that at least substantially corresponds to the outer diameter of the fuel cell assemblies 36. The detail design of the combustion chamber 28 is not crucial for the gist of the disclosure herein and is thus not explained in detail herein. A skilled person will be able to consider a suitable design for the combustion chamber 28.

Figure 3A:
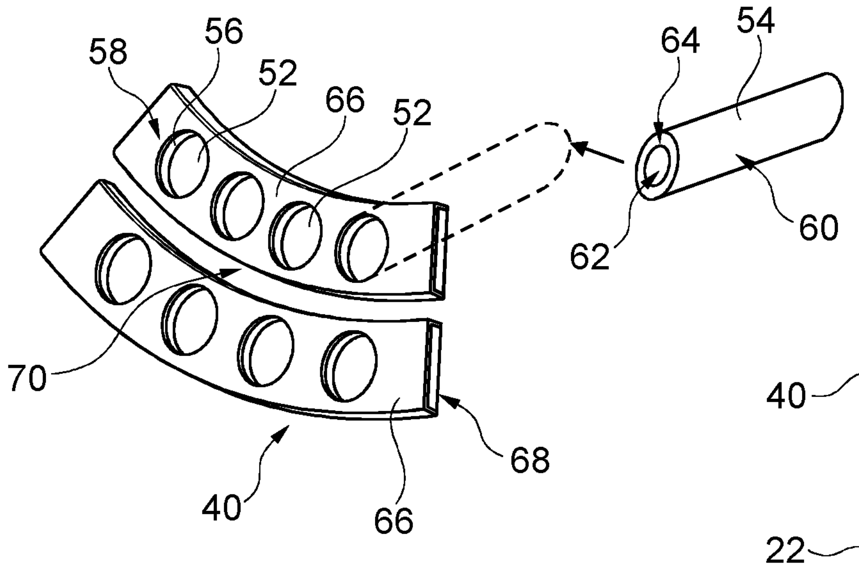
FIGS. 3*a* and 3*b* show a schematic illustration of segments of a stacking manifold as well as a schematic sectional view of a stacking manifold.

FIG. 3*a* shows a part of a first stacking manifold 40, which comprises a plurality of holes 52 for receiving a tubular fuel cell 54 each. Inside each of the holes 52, an interface connector 56 is provided in the form of uncoated stainless steel. The first stacking manifold 40 is as an example made from stainless steel and comprises a thin aluminum oxide coating 58 except in places, where an electrical contact is required, e.g. at the interface connectors 56. This allows to provide a design solution for compiling the stacking manifolds 40 and 42 and the interface connectors 56 as a single component, which minimizes the stack weight, improves the electron transport, and also minimizes chromium release from the stacking manifolds 40 and 42.

The fuel cell 54 comprises a cathode 60 as an outer layer, an anode 62 as an inner layer and an electrolyte 64 between both. For their operation, hydrogen is routed into the anodes 62 and flows through the tubular fuel cells 54, while air enters the fuel cells 54 through pores inside the cathode 60. Hence, the first stacking manifold 40 is designed to let the hydrogen flow through holes 52 into the anodes 62. The holes 52 are distributed on the stacking manifolds 40 and 42 to space apart the fuel cells 54 from each other, such that the cathodes 60 can be flushed by air.

In the example embodiment, the first stacking manifold 40 and the second stacking manifold 42 comprise a plurality of individual segments 66, which provide a parallel connection to a small group of fuel cells 54. Several of these groups can be connected in a serial connection to each other through interface connectors 68, which are also realized in the form of uncoated surfaces of the first stacking manifold 40. The segments and 66 are spaced apart in the radial direction, such that a gap 70 is created, through which air can enter the respective fuel cell assembly 36 to flush the fuel cells 54 with air.

Figure 3B:
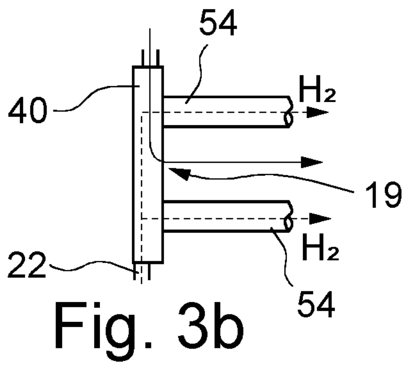

FIG. 3*b* shows a schematic sectional view of a first stacking manifold 40. Here, exemplarily one of the hydrogen inlets 22 is shown, through which hydrogen enters the first stacking manifold 40 and is distributed to all associated SOFCs 54. Furthermore, an air inlet 18 of the first stacking manifold 40 is shown, through which air enters the first stacking manifold 40 and is distributed to a plurality of air supply openings 19. These may be separate openings in the respective first stacking manifold 40 or may be realized through gaps between segments 66 in a radial and/or circumferential direction. In analogy, the second stacking manifold 42 may comprise several air exit openings, through which unused air from the air supply openings 19 can enter the second stacking manifold 42.

Figure 4:
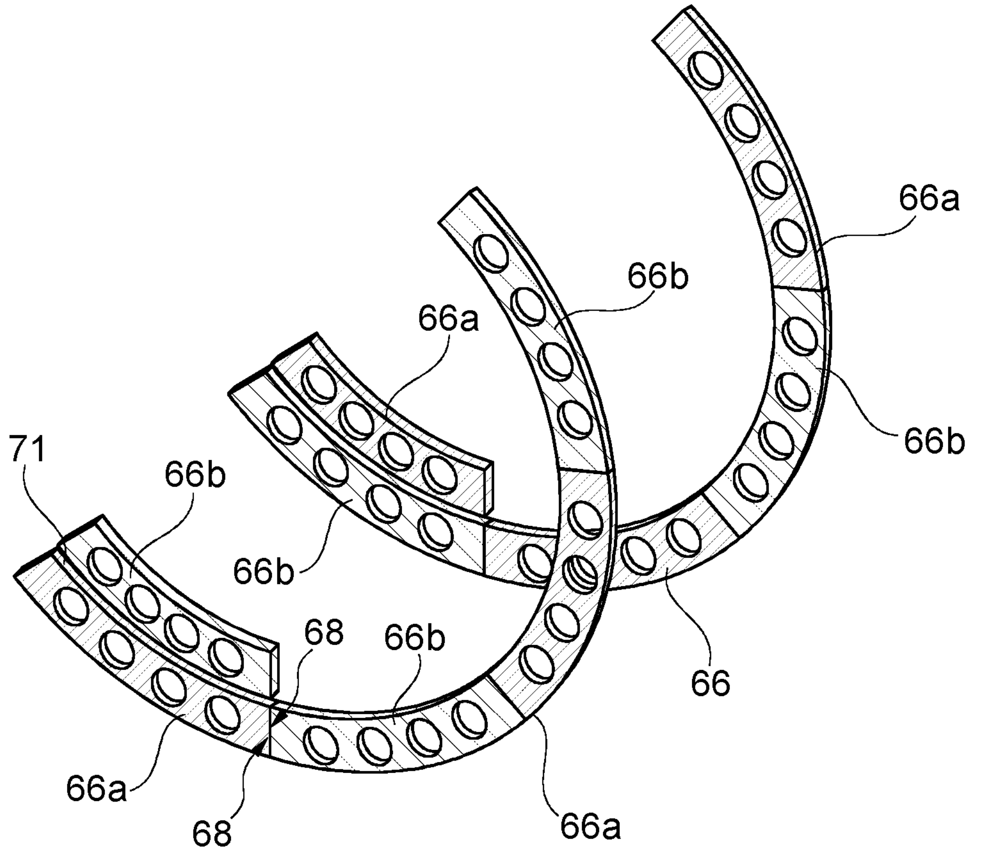
FIG. 4 shows a schematic illustration of a plurality of interconnected segments of a stacking manifold.

In FIG. 4, an example interconnection of several segments 66 is shown. For the sake of better understanding, positive terminals in the form of segments 66*a* are hatched differently than negative terminals 66*b*. Positive terminals 66*a* and negative terminals 66*b* follow on each other in an alternating manner in a circumferential direction to form a ring shape. They are connected through interface connectors 68 arranged at the sides of the segments 66*a* and 66*b*. A plurality of concentrically ring-shaped arrangements of segments 66*a* and 66*b* are created, which are only indicated partially in FIG. 4. A radial connection between one of the segments 66*a* or 66*b* of one ring is connected to one of the segments 66*a* or 66*b* of an adjacent ring through an additional connector 71. Here, a segment 66*b* constituting a negative terminal is connected to a radially further inwardly positioned segment 66*a* forming a positive terminal. The interconnections can be tailored to the individual needs.

Figure 5:
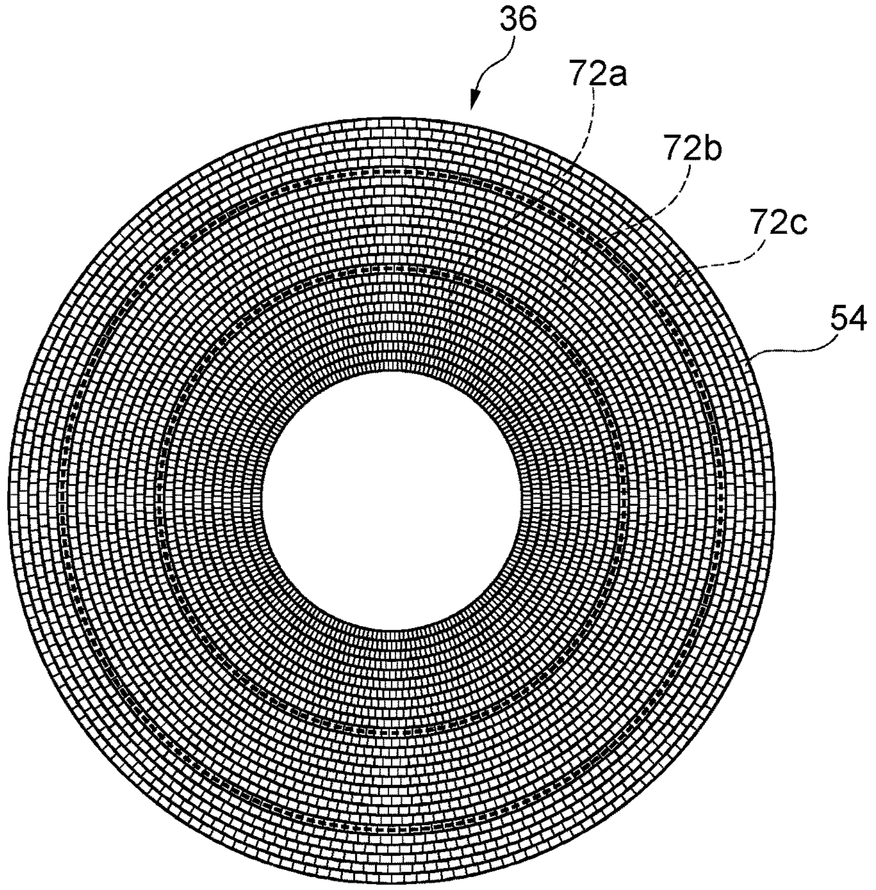
FIG. 5 shows a schematic illustration of a front face of a fuel cell assembly.

FIG. 5 shows a schematic view of a fuel cell assembly 36. Here, a plurality of individual fuel cells 54 are shown in a dense packing. Here, several concentrical rings of fuel cells 54 are provided that enclose each other and form a hollow-cylindrical shape. Thus, the fuel cell assembly 36 a has a plurality of fuel cells 54 staggered radially and circumferentially. Exemplarily, three groups 72*a*, 72*b* and 72*c* of fuel cells 54 are created, which comprise different types of tubular SOFCs 54. For example, the radially innermost group 72*a* comprises electrolyte supported SOFC's, while the radially central group comprises anode supported SOFC's and while the radially outermost group 72*c* comprises metal supported SOFC's. These comprise different operating temperature ranges of substantially 550° C. to 650° C. for the first group 72*a*, 650° C. to 750° C. for the second group 72*b* and 750° C. to 850° C. for the third group 72*c*. Thus, a cumbersome and technically challenging harmonization of operating temperatures inside the fuel cell stack 16, i.e. inside each of the fuel-cell assemblies 36*a* to 36*f*, is not required.

Figure 6:
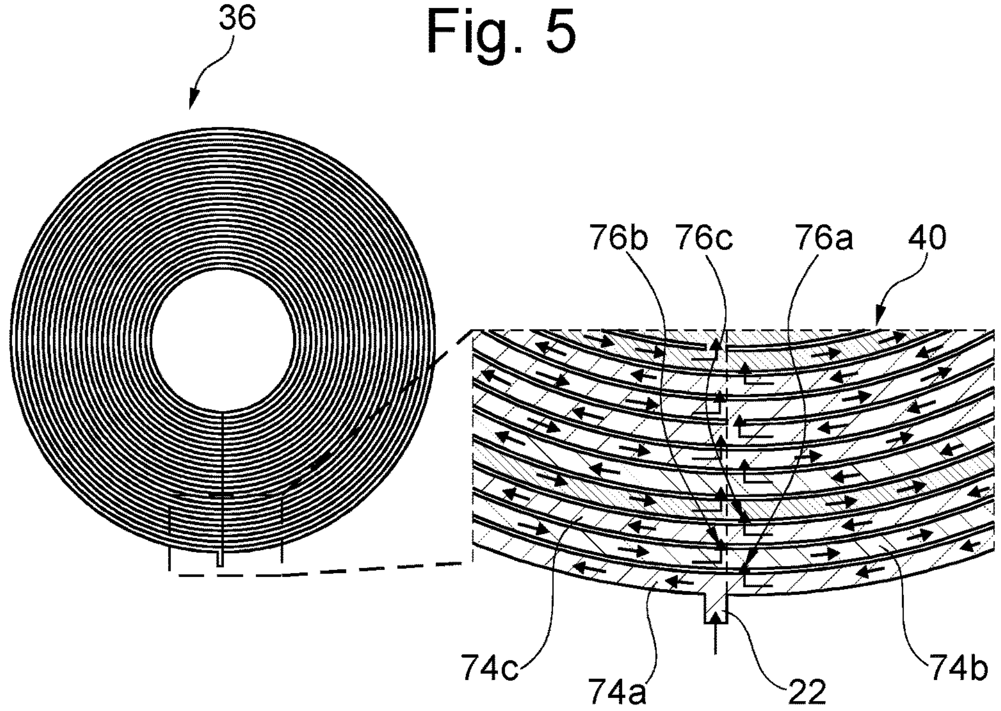
FIG. 6 shows a schematic illustration of a hydrogen supply into a fuel cell assembly.

FIG. 6 shows the hydrogen inlet 22 arranged in the first stacking manifold 40 and the distribution of hydrogen to the individual fuel cells 54. Here, the first stacking manifold 40 distributes the hydrogen to individual rings of fuel cells 54 one after another from the radial outermost position to a radial innermost position. Here, a flow path 74*a* directly follows on the hydrogen inlet 22 and runs in a circumferential direction about 360°. In doing so, all fuel cells 54 connected to this flow path 74*a* are supplied with hydrogen. Afterwards, hydrogen passes through an interconnection opening 76*a* and reaches into a second circumferential flow path 74*b*. Here, the hydrogen flows in a circumferential direction in an opposite direction about 360° and all connected fuel cells 54 are supplied with hydrogen as well. Afterwards, a further interconnection opening 76*b* is passed and hydrogen flows into a further flow path 74*c*, which again runs in a circumferential direction about 360° in an opposite direction and so on. Hence, all of the fuel cells 54 will be supplied with hydrogen flowing into the hydrogen inlet 22 one after another.

Figure 7:
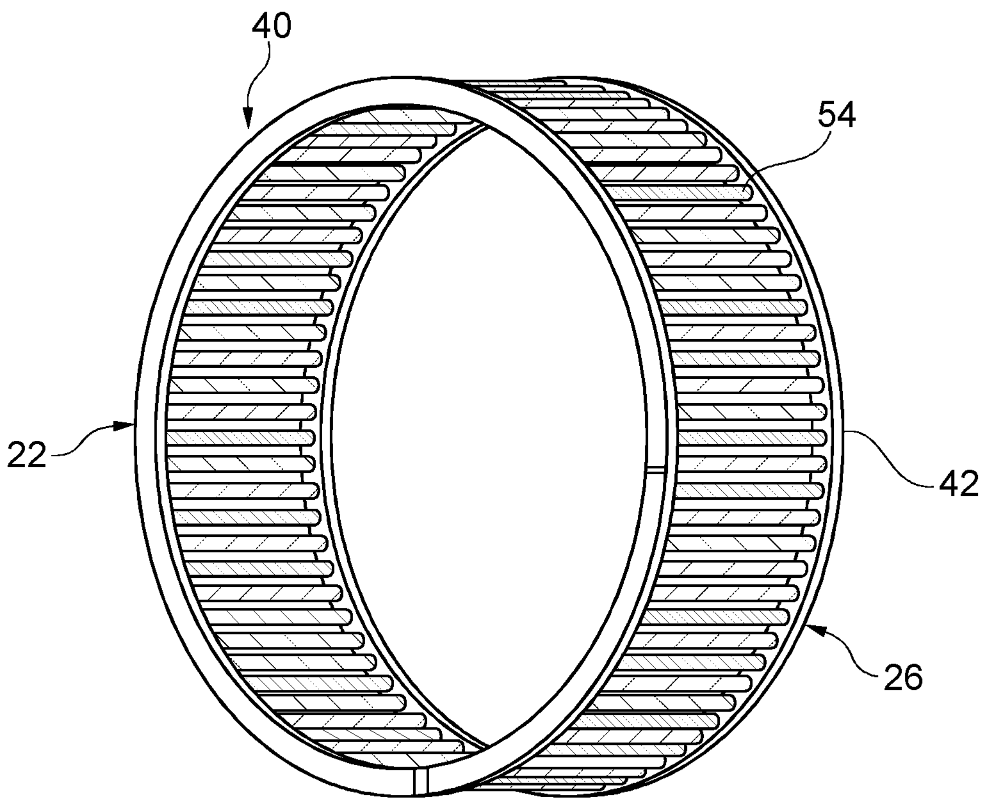
FIG. 7 shows a schematic illustration of a ring of fuel cells of FIG. 6 and their hydrogen supply.

The supply of one ring of tubular SOFCs 54 with hydrogen is shown in a spatial illustration in FIG. 7 for further clarification. Here, hydrogen enters the hydrogen inlet 22, is distributed in a circumferential direction of the first stacking manifold 40, to feed hydrogen into all individual fuel cells 54. After flowing through the fuel cells 54, hydrogen reaches the second stacking manifold 42 and exits through the hydrogen and steam outlet 26. It is clear that the hydrogen supply to the hydrogen inlet 22 is sufficient to feed further rings of tubular SOFCs by appropriately balancing all flow resistances in the first stacking manifold 40 and the tubular fuel cells 54 and choosing a suitable supply pressure at the hydrogen inlet 22.

Figure 8:
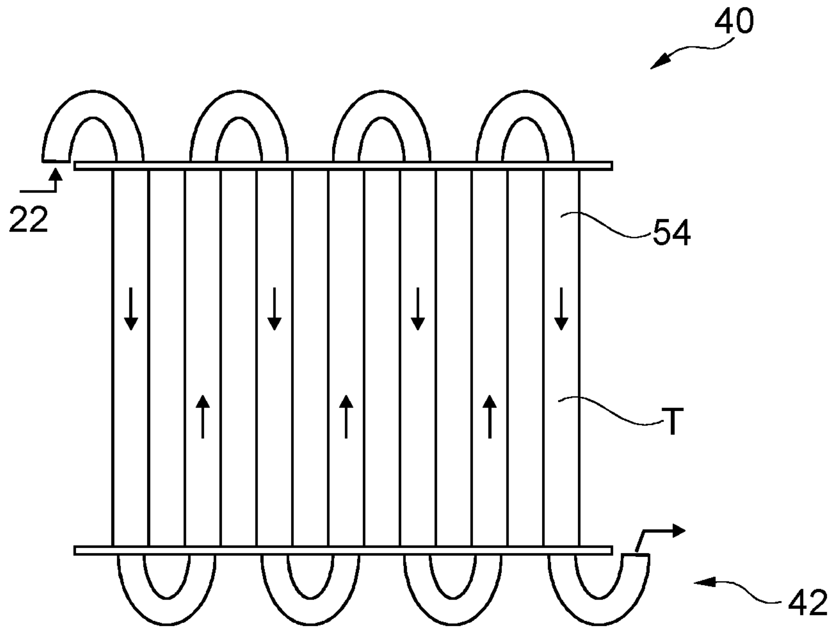
FIG. 8 shows a modified hydrogen distribution into a ring of fuel cells.

FIG. 8 shows a modified approach for distributing hydrogen. Here, the first stacking manifold 40 and the second stacking manifold 42 are configured to alternately flow hydrogen from the hydrogen inlet 22 of the first stacking manifold 40 through circumferentially successive fuel cells 54 in an alternating axial flow direction in a zigzag manner.

Figure 9:
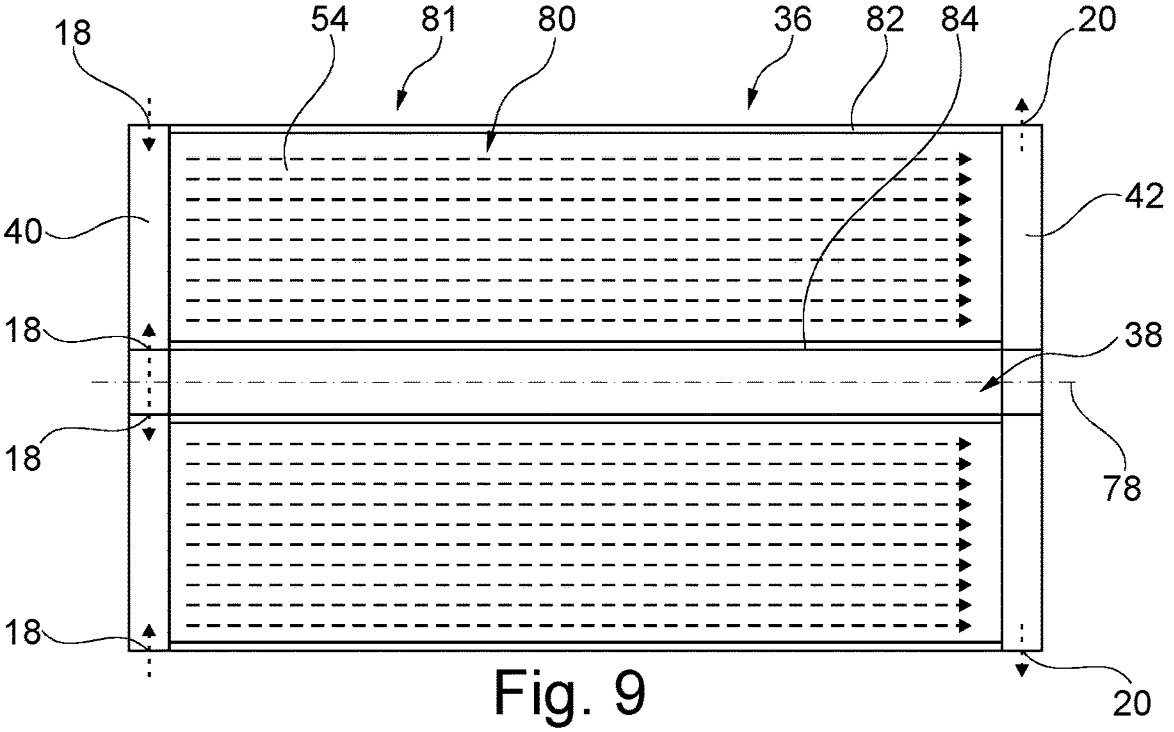
FIG. 9 shows an interior space of a fuel cell assembly and an air flow created therein.

In FIG. 9, a sectional view of a fuel cell assembly 36 is shown. Here, a central axis 78 is indicated, along which the central recess 38 extends. All tubular fuel cells 54 are arranged parallel to the central axis 78 and are packed between the first stacking manifold 40 and the second stacking manifold 42. As shown before, several air inlets 18 are provided, which let air flow in a radial direction into the first stacking manifold 40, from which it will be distributed into an interior space 80 of a housing 81 of the fuel cell assembly 36. The fuel cell assembly 36 exemplarily comprises a closed housing 81 having an outer housing skin 82 and an inner housing skin 84, which are provided extending between the first stacking manifold 40 and the second stacking manifold 42. The inner housing skin 84 has a hollow cylindrical shape with an inner diameter corresponding to the outer diameter of the central recess 38. The outer housing skin 82 has an outer diameter that corresponds to the outer diameter of the stacking manifolds 40 and 42. Air that enters the air inlets 18 are flowing through the interior space 80 and thereby all fuel cells 54 are flushed with air. After passing the fuel cells 54, the air exits the air outlets 20. In the exemplary embodiment of FIG. 9, the air flows in a substantially axial direction.

Figure 10:
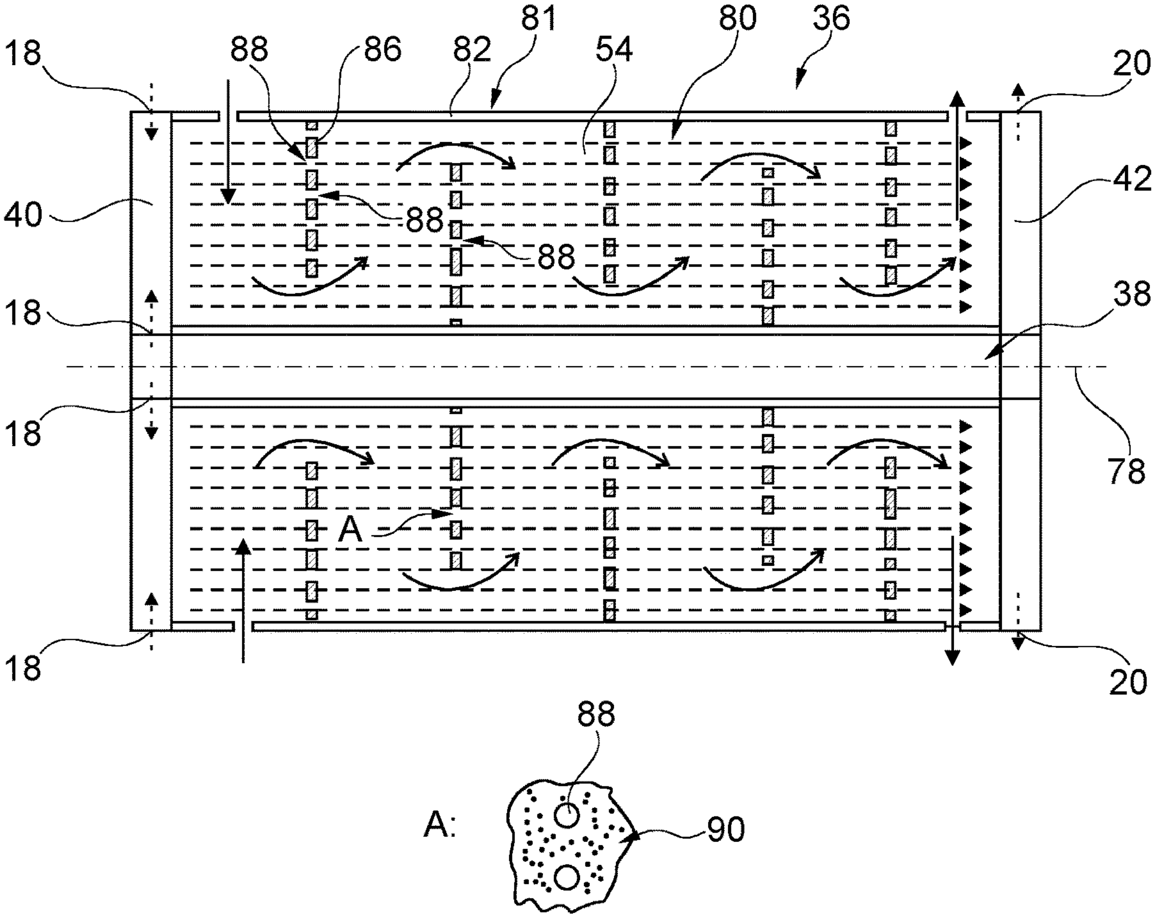
FIG. 10 shows a modified interior space of a fuel cell assembly and an air flow created therein around baffle plates.

In FIG. 10 this arrangement is modified in that a plurality of baffle plates 86 having different sizes and extending in a radial direction is provided. The baffle plates have openings 88 for letting the fuel cells 54 pass through. By providing the baffle plates with different diameters, the air flow direction changes several times and thus, the flushing of the fuel cells 54 is improved. An additional perforation 90 allows air to pass through the baffle plates 86 in an axial direction.

REFERENCE NUMERALS

2 aircraft engine
4 front side
6 rear side
8 compressor unit
10 compressor wheel
12 engine shaft
14 air
16 solid oxide fuel cell stack
18 air inlet
19 air supply opening
20 air outlet
22 hydrogen inlet
24 hydrogen source
26 hydrogen and steam outlet
28 combustion chamber
30 separate hydrogen inlet
32 additional air inlet
34 turbine unit
36 fuel cell assembly
37 gap
38 central recess
40 first stacking manifold
42 second stacking manifold
44 air manifold
46 circular pipe
48 hydrogen supply pipe
50 hydrogen and steam pipe

52 hole
54 tubular fuel cell
56 interface connector
58 aluminium oxide coating
60 cathode
62 anode
64 electrolyte
66 segment
68 interface connector
70 gap
71 connector
72 group of fuel cells
74 flow path
76 interconnection opening
78 central axis
80 interior space
81 housing
82 outer housing skin
84 inner housing skin
86 baffle plate
88 opening
90 perforation

The invention claimed is:

1. A solid oxide fuel cell stack for an aircraft engine, comprising:

a plurality of ring-shaped fuel cell assemblies of a plurality of tubular solid oxide fuel cells each, the fuel cells being parallel to each other and distributed circumferentially around a central axis;

at least one first stacking manifold for each fuel cell assembly in contact with a first side of the individual fuel cell assembly;

at least one second stacking manifold for each fuel cell assembly in contact with a second side of the individual fuel cell assembly; and a central recess for leading an engine shaft through;

wherein the fuel cells each comprise an anode and a cathode;

wherein the fuel cell assemblies are stacked in an axial direction through pairs of first stacking manifolds and second stacking manifolds contacting each other;

wherein each first stacking manifold comprises a hydrogen inlet and is connected to first ends of the anodes of the respective fuel cells; and wherein each second stacking manifold comprises a hydrogen and steam outlet and is connected to second ends of the anodes of the respective fuel cells.

2. The solid oxide fuel cell stack of claim 1, wherein the plurality of tubular solid oxide fuel cells of each ring-shaped assembly are staggered radially to form at least two rings of fuel cells.

3. The solid oxide fuel cell stack of claim 2, wherein at least one of the fuel cell assemblies comprises at least two groups of fuel cells separated in a radial direction, and wherein the at least two groups comprise different types of solid oxide fuel cells with different operating temperature ranges.

4. The solid oxide fuel cell stack of claim 3, wherein the operating temperature range of a radially outer group is higher than the operating temperature range of a radial further inward group.

5. The solid oxide fuel cell stack of claim 3, wherein at least one of the fuel cell assemblies comprises three groups of fuel cells separated in the radial direction with different operating temperature ranges.

6. The solid oxide fuel cell stack of claim 5, wherein a radially outermost group comprises electrolyte supported solid oxide fuel cells, wherein a radially central group comprises anode supported solid oxide fuel cells, and wherein a radially innermost group comprises metal supported solid oxide fuel cells.

7. The solid oxide fuel cell stack of claim 6, wherein the radially outermost group comprises an operating temperature range of 750° C. to 850° C., wherein the radially central group comprises an operating temperature range of 650° C. to 750° C., and wherein the radially innermost group comprises an operating temperature range of 550° C. to 650° C.

8. A solid oxide fuel cell stack of claim 1, wherein the first stacking manifold and the second stacking manifold are configured to alternately flow hydrogen from the hydrogen inlet of the first stacking manifold through circumferentially successive fuel cells in an alternating axial flow direction in a zigzag manner.

9. The solid oxide fuel cell stack of claim 1, wherein the first stacking manifold is configured to flow hydrogen from the hydrogen inlet of the first stacking manifold through circumferentially successive fuel cells in a same axial flow direction towards the second stacking manifold.

10. The solid oxide fuel cell stack of claim 1, wherein the fuel cells are spaced apart from each other in a radial direction, wherein the fuel cell stack comprises a housing enclosing the fuel cells, and wherein an air inlet and an air outlet are arranged at the housing to let air flow through the housing to flush the fuel cells with air.

11. The solid oxide fuel cell stack of claim 10, comprising baffle plates inside the housing, wherein the baffle plates are spaced apart from each other in an axial direction and extend in a radial direction, wherein axially consecutive baffle plates have different radial dimensions, and wherein the baffle plates have openings to let the fuel cells pass through.

12. The solid oxide fuel cell stack of claim 1, wherein the stacking manifolds comprise stainless steel and an aluminum oxide coating.

13. The solid oxide fuel cell stack of claim 1, wherein the stacking manifolds comprise a hole for each of the fuel cells.

14. An aircraft engine, comprising:

a solid oxide fuel cell stack of claim 1;

a combustion chamber downstream of the fuel cell stack;

a turbine unit downstream of the combustion chamber; and a compressor unit upstream of the fuel cell stack and connected to the turbine unit through an engine shaft extending through the central recess.

15. The aircraft engine of claim 14, wherein the combustion chamber is in fluid communication with the hydrogen and steam outlets of the fuel cell assemblies and comprises an air inlet.

* * * * *